3,244,410
TWIN-BLADE MIXER
Claude K. Myers, 8376 Salt Lake Ave., Bell, Calif.
Filed Feb. 10, 1964, Ser. No. 343,657
4 Claims. (Cl. 259—131)

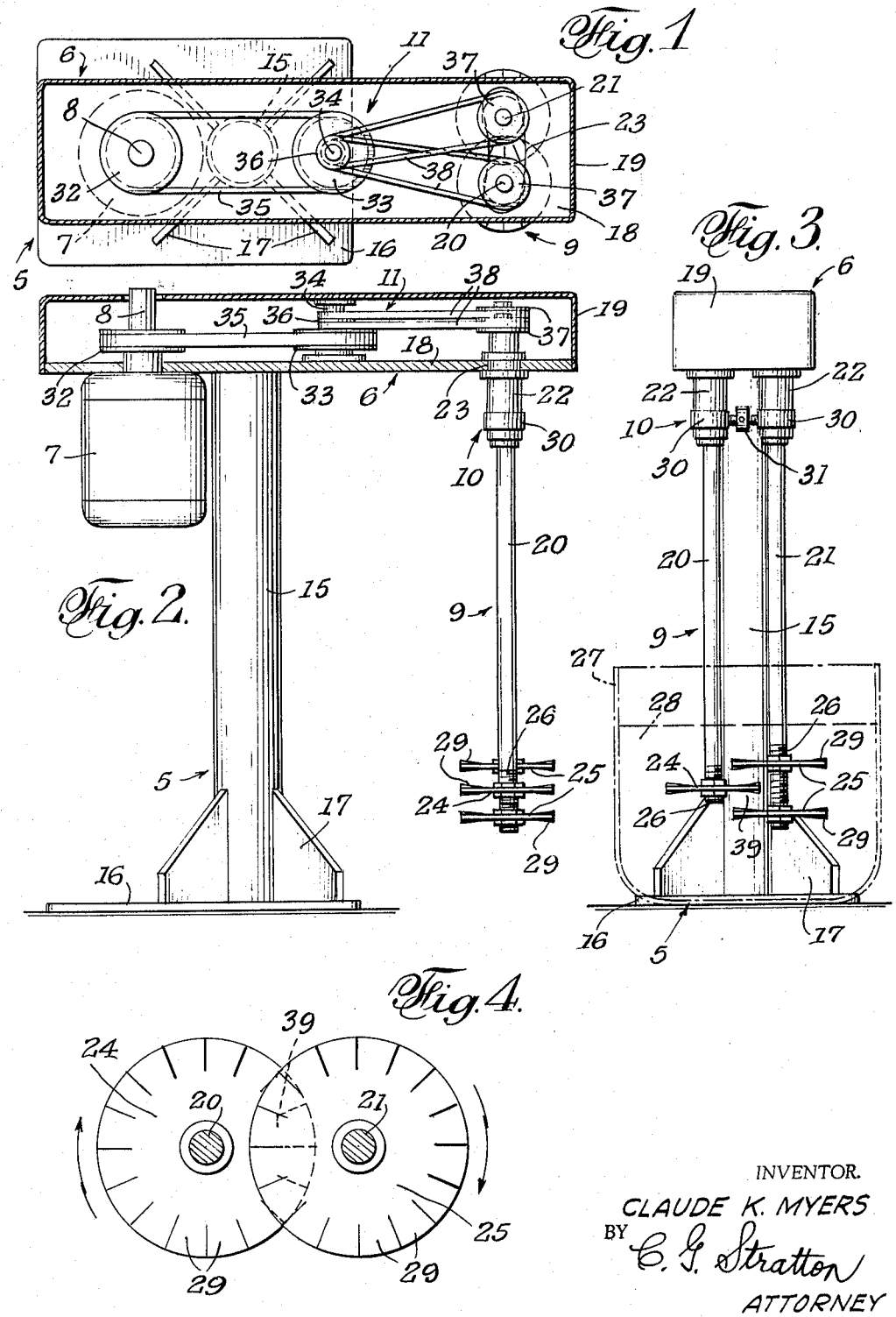

This invention relates to a mixing device having general utility but especially adapted for efficiently producing a dispersion of particle-incorporated material of a viscous nature.

An object of the present invention is to provide a mixing device in which twin blades means are so arranged that the same have a bearing action on the material being mixed to, thereby, reduce the size of particles embodied in a viscous material.

Another object of the invention is to provide a mixing device that simultaneously produces dispersion and shearing actions on the material being acted on by the device.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a top plan view, with a housing portion cut away, of a twin-blade mixer according to the present invention.

FIG. 2 is a vertical sectional view of said mixer.

FIG. 3 is a front elevational view.

FIG. 4 is an enlarged plan view of the twin-blade mixer means of the present device.

The mixer that is illustrated comprises, generally, a support standard 5, a horizontal housing 6 mounted on the top of the standard, an electric motor 7 carried by said housing and having a vertical output shaft 8 extending into the housing, mixing means 9 extending downwardly from the housing 6, parallel to the standard 5, means 10 to adjust the means 9, and a drive 11 between the motor shaft 8 and the mixing means 9.

The support standard 5 is shown as a tubular column 15 on a base plate 16 and steadied thereon by braces 17. A horizontal plate 18 is affixed to the top of column 15, the same comprising the bottom of hte housing 6.

The housing 6 extends both rearwardly and forwardly of the column 15, the latter extension being the greater and mounting the mixing means 9. A cover 19 is fitted onto the housing bottom 18.

The motor 17 is preferably affixed to the housing bottom 18 and extends below said bottom adjacent to the rearward side of the column 15.

The mixing means 9 is shown as two vertically parallel shafts 20 and 21 arranged preferably in side-by-side relation, as seen from the front of the device. Each said shaft 20 and 21 is provided with a journal fitting 22 that extends partly below and partly above the housing bottom 18 through an arcuate slot 23 in said bottom. Said means 9 further comprises a single impeller or blade 24 on the lower end of said 20, and two similar and vertically spaced impellers or blades 25 on the shaft 21 and arranged one above and the other below the impeller 24. The blades 24 and 25 are vertically adjustable on their relative shafts, threads 26 being shown for this purpose. Thus, the vertical relationship of the impellers may be changed as desired to meet various mixing and shearing conditions.

It will be clear that said impellers are operable within a container 27 to mix and shear material 28 therein, said container being adapted to be placed in operative position in any of the well-known ways for doing so. Said impellers are shown as circular members that rotate on the respective axes of the shafts 20 and 21, and may be provided adjacent their peripheries with shearing portions 29.

The means 10 is shown as a jack type of device that comprises sleeves 30 applied to the shaft bearing fittings 22, and a turnbuckle type of nut 31 with its respective right and left-hand threaded portions engaged with said sleeves. It will be understood that according to the direction of rotational adjustment of the nut 31, the fittings 22 will be spread apart or drawn toward each other to, thereby, vary the overlap of the peripheral edge portions 29 of the impellers on the two shafts 20 and 21. The adjustment may be locked, but the one shown is self-locking on the nut threads.

The drive 11 is shown as a pulley 32 on the motor shaft 8, a pulley 33 on a jack shaft 34 and a belt 35 trained over the pulleys 32 and 33 to cause the former to drive the latter. Said jack shaft 34 is located nearer the slot 23 than is the motor shaft 8.

The drive 11 further includes a double pulley 36 affixed and rotational with the pulley 33 which is larger than the pulley 36, a pulley 37 on each of the shafts 20 and 21, and belts 38 trained around the double pulley 36 and each of the pulleys 37. The sizes and proportions of the pulley diameters may be arranged to provide the desired rotational speed of the shafts 20 and 21 with respect to the speed of the motor shaft 8.

The arrangement of belts and pulleys that is illustrated provides for a slower rotational speed of the shafts 20 and 21 relative to the speed of the motor shaft. But this may be varied, it being necessary only to provide a drive to the shafts 20 and 21 that allows for adjustment of said shafts in the arcuate slot 23 by the means 10 to provide a desired overlap of the impellers. Thus, the shearing action or effect of the impellers, as produced by the degree of overlap, is best illustrated by the area 39 of FIG. 4, is being clear that the shearing portions 29 of the impellers co-act with each other due to the overlapped relationship of said portions in the area 39.

It will be noted that the shafts 20 and 21 are driven in the same direction and that the overlapping portions of the impellers move in opposite directions, the relative speed of movement of said parts being twice that of the shaft speed. Hence, the shearing action that is obtained is increased and provides increased shearing of particles, such as rubber, plastic or other elastomer-type material, incorporated in the material 28. Fine-particle dispersion of such elastomer material is efficiently obtained.

Vertical adjustment of the shafts 20 and 21 may be conventionally provided.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

It is believed clear without further illustration that each of the shafts 20 and 21 may have a plurality of impellers or blades arranged longitudinally on each shaft, staggered with respect to the impellers or blades on the other shaft, and all impellers or blades arranged in overlapping relation with each other to provide a multiplicity of shearing areas.

Having thus described this invention, what is claimed and desired to be secured by Letters Patent is:

1. A mixer comprising:
   (a) two parallel shafts driven in the same direction,
   (b) an impeller on one shaft,
   (c) two impellers on the other shaft in longitudinal spaced relation one on each side of the first-mentioned impeller,
   (d) means mounting the shafts to space them a distance less than the diametral size of the impellers, whereby the peripheral portions thereof overlap, and
   (e) means to adjust the spacing of the axes of said shafts to vary the degree of impeller overlap.

2. In a mixing device according to claim 1, means mounting the impellers on their respective shafts for adjusting the longitudinal positions of the impellers relative to their shafts and to each other.

3. A mixer comprising:
   (a) two parallel shafts driven in the same direction,
   (b) an impeller on one shaft,
   (c) two impellers on the other shaft in longitudinal spaced relation, one on each side of the first-mentioned impeller,
   (d) means mounting the shafts to space them a distance less than the diametral size of the impellers, whereby the peripheral portions thereof overlap, and
   (e) means to vary the spacing of the two shafts to, thereby, vary the degree of impeller overlap.

4. A mixer comprising:
   (a) two parallel shafts driven in the same direction,
   (b) an impeller on one shaft,
   (c) two impellers on the other shaft in longitudinal spaced relation, one on each side of the first-mentioned impeller,
   (d) means mounting the shafts to space them a distance less than the diametral size of the impellers, whereby the peripheral portions thereof overlap,
   (e) means to vary the longitudinal position of the impellers on their respective shafts and the longitudinal spacing between the impellers of both shafts, and
   (f) means to vary the spacing of the two shafts to thereby, vary the degree of impeller overlap.

References Cited by the Examiner
UNITED STATES PATENTS

| | | | |
|---|---|---|---|
| 309,574 | 12/1884 | Sergeant | 259—104 X |
| 1,693,170 | 11/1928 | Alsop | 259—106 |
| 2,750,161 | 6/1956 | Simmons | 259—6 |

IRVING BUNEVICH, *Primary Examiner.*

WILLIAM I. PRICE, *Examiner.*